May 13, 1958     HIROSHI ITO     2,834,253
HIGH APERTURE WIDE ANGLE FOUR COMPONENT LENS
Filed Aug. 24, 1955

SPHERICAL ABERATION AND
UNSATISFIED AMOUNT OF     ASTIGMATISM     DISTORTION
SINE CONDITION

INVENTOR.
HIROSHI ITO
BY
ATTORNEY

United States Patent Office 2,834,253
Patented May 13, 1958

2,834,253
HIGH APERTURE WIDE ANGLE FOUR COMPONENT LENS

Hiroshi Ito, Setagaya-ku, Tokyo, Japan, assignor to Canon Camera Company, Inc., Tokyo, Japan, a corporation of Japan Application August 24, 1955, Serial No. 530,243

Claims priority, application Japan December 1, 1954

2 Claims. (Cl. 88—57)

This invention relates to an improved high aperture wide angle lens.

The object of this invention is to obtain a wide angle lens having a higher aperture than that in prior known wide angle lenses by removing completely the chromatic aberration and minimizing the spherical aberration due to the oblique pencil of light, and furthermore, by removing astigmatism and axial spherical aberration.

The lens according to this invention is advantageously adaptable particularly to small cameras having an including angle ($2\omega$) of more than 60 degrees and an aperture of approximately F:2 comprising four lens components air spaced from each other, wherein components No. 1 and No. 4 are cemented positive lenses of meniscus style and component No. 2 is similarly a cemented negative lens of meniscus style and component No. 3 is a single negative lens, such seven lenses being constructed wherein each and every curved surface including the cemented surfaces is concave toward the stop and specific values are given to each constructional factor thereof.

A clear conception of the scope and purpose of this invention may be obtained from the following description, taken in connection with the attached drawing, in which.

$L_1$ and $L_4$ are cemented positive lenses of meniscus style. $L_2$ is a cemented negative lens of meniscus style. $L_3$ is a single negative lens. $L_1$ $L_2$ and $L_3$ $L_4$ are arranged approximately symmetrically on both sides of a stop so that each and every curved surface, $r_1$ to $r_{11}$ inclusive, including the cemented surfaces thereof, face concave toward the stop. In such system consisting of seven lenses, the following magnitudes are observed for the respective refractive indices $n$ and Abbe numbers $v$:

| | |
|---|---|
| $0.12 > n_2 - n_1 > 0.03$ | $32 > v_2 - v_1 > 10$ |
| $1.75 > n_3 > 1.58$ | $60 > v_3 > 35$ |
| $1.75 > n_4 > 1.58$ | $50 > v_4 > 26$ |
| $1.76 > n_5 > 1.56$ | $45 > v_5 > 25$ |
| $0.12 > n_6 - n_7 > 0.03$ | $32 > v_6 - v_7 > 10$ |

The absolute values of the cemented surfaces, $r_2$ and $r_{10}$, of the lens components $L_1$ and $L_4$ and of the concave surfaces $r_6$ and $r_7$ toward the stop of the lens components $L_2$ and $L_3$ conform to the following conditions:

| | |
|---|---|
| $0.40f > r_2 > 0.25f$ | $0.50f > \|r_{10}\| > 0.24f$ |
| $0.29f > r_6 > 0.18f$ | $0.30f > \|r_7\| > 0.18f$ | where $f$ is the focal length of the whole objective. An example of all of the constructional factors of the lenses to satisfy the above conditions is given below:

[$f = 100$    F:2    $2\omega = 60°$.]

Figure 1:
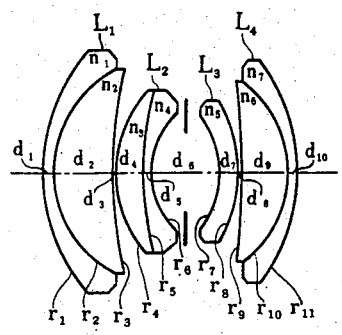
Fig. 1 shows a sectional view of an embodiment with respect to a high aperture wide angle lens according to this invention.
Figure 2:
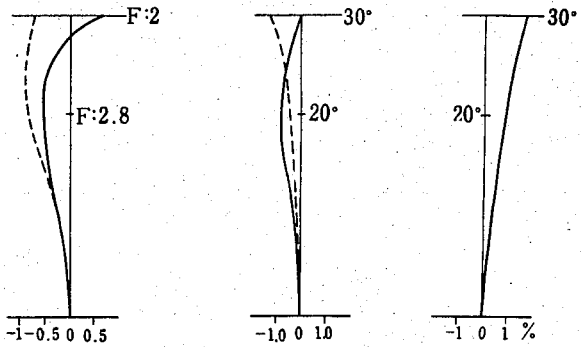
Fig. 2 shows a graph of the aberration curves thereof.

| Lens | Radius $r$ | Axial Thickness or Air Spacing, $d$ | $n$ | $v$ |
|---|---|---|---|---|
| $L_1$ | $r_1 = 50.0$ | $d_1 = 2.5$ | $n_1 = 1.6200$ | $v_1 = 36.3$ |
| | $r_2 = 30.0$ | $d_2 = 15.2$ | $n_2 = 1.6935$ | $v_2 = 53.5$ |
| | $r_3 = 107.0$ | $d_3 = 0.3$ | | |
| $L_2$ | $r_4 = 34.0$ | $d_4 = 7.77$ | $n_3 = 1.6237$ | $v_3 = 47.0$ |
| | $r_5 = 95.8$ | $d_5 = 2.1$ | $n_4 = 1.6200$ | $v_4 = 36.3$ |
| | $r_6 = 23.5$ | $d_6 = 18.5$ | | |
| $L_3$ | $r_7 = -24.8$ | $d_7 = 5.4$ | $n_5 = 1.6889$ | $v_5 = 31.1$ |
| | $r_8 = -34.0$ | $d_8 = 0.3$ | | |
| $L_4$ | $r_9 = -704.2$ | $d_9 = 13.5$ | $n_6 = 1.6935$ | $v_6 = 53.5$ |
| | $r_{10} = -30.0$ | $d_{10} = 2.5$ | $n_7 = 1.6364$ | $v_7 = 35.4$ |
| | $r_{11} = -55.28$ | | | | where $L_{subscript}$ is the lens component, $n_{subscript}$ the refractive index on the helium D-line, $v_{subscript}$ the Abbe number of the lens element, $r_{subscript}$ the radius of curvature of the lens surface, and $d_{subscript}$ the thickness of the lens along the optical axis or the air gap therealong between successive lenses, the subscripts increasing in the direction from the object to the image side of the objective. Fig. 2 shows the aberration on helium D-line obtained as the result of calculation in accordance with the above embodiment. As easily observed in these curves, the various aberrations are quite insignificant. Thus a lens of F:2 aperture class, having a higher aperture than that in prior known wide angle lenses having an including angle of more than 60 degrees, is obtainable.

In this invention, by giving the above specific magnitudes to the cemented surfaces $r_2$ and $r_{10}$ of the No. 1 and No. 4 lens components, $L_1$ and $L_4$, the chromatic aberration is completely removed and also the spherical aberration due to the oblique pencils of light is minimized. Furthermore astigmatism and axial spherical aberration are removed by giving the above values on $r_6$ and $r_7$.

I claim:

1. A high aperture wide angle lens comprising a diaphragm, a first cemented positive lens of which each constituent lens is of meniscus shape, a first cemented negative lens of which each constituent lens is of meniscus shape, the first cemented positive and the first cemented negative lenses being air spaced from each other and to the object side of the diaphragm, a single negative lens of meniscus shape, and a second cemented positive lens of which each constituent lens is of meniscus shape, the single negative and the second cemented positive lenses being air spaced from each other and to the image side of the diaphragm, every curved surface of each lens and including the cemented surfaces being disposed concave toward the stop, the refractive indices, $n_{subscript}$, and the Abbe numbers, $v_{subscript}$, of the lens elements, with the subscripts increasing in the direction from the object to the image side of the array, satisfying the following conditions:

| | |
|---|---|
| $0.12 > n_2 - n_1 > 0.03$ | $32 > v_2 - v_1 > 10$ |
| $1.75 > n_3 > 1.58$ | $60 > v_3 > 35$ |
| $1.75 > n_4 > 1.58$ | $50 > v_4 > 26$ |
| $1.76 > n_5 > 1.56$ | $45 > v_5 > 25$ |
| $0.12 > n_6 - n_7 > 0.03$ | $32 > v_6 - v_7 > 10$ | and the following relations with respect to the absolute values for the radii of curvature of the cemented surfaces $r_2$ and $r_{10}$ of the first and second cemented positive lenses and the concave surfaces, $r_6$ and $r_7$, of the cemented negative lens and the single negative lens toward the stop:

| | |
|---|---|
| $0.40 f > r_2 > 0.25 f$ | $0.50 f > \|r_{10}\| > 0.24 f$ |
| $0.29 f > r_6 > 0.18 f$ | $0.30 f > \|r_7\| > 0.18 f$ | where $f$ is the focal length of the whole objective.

2. A high aperture wide angle lens system comprising in succession from the object to the image side thereof, a first cemented positive lens of two constituent meniscus shaped lenses, a first cemented negative lens of two constituent meniscus shaped lenses and air spaced from the first cemented positive lens, a diaphragm air spaced from the first cemented negative lens, a single negative meniscus shaped lens air spaced from the diaphragm, and a second cemented positive lens of two constituent meniscus shaped lenses, each concave surface of each lens inclusive of the cemented surfaces of the first and second cemented positive and of the first cemented negative lenses facing the diaphragm, and having the following values of the radii of curvature, $r_{subscript}$, lens thicknesses and air spaces, $d_{subscript}$, at the optical axis, and refractive indices, $n_{subscript}$, and Abbe numbers, $v_{subscript}$, of the glass of its lenses, the subscripts increasing in the stated succession:

[$f = 100$     F:2     Including angle = 60°.]

| r | d | n | v |
|---|---|---|---|
| $r_1 = 50.0$ | | | |
| | $d_1 = 2.5$ | $n_1 = 1.6200$ | $v_1 = 36.3$ |
| $r_2 = 30.0$ | | | |
| | $d_2 = 15.2$ | $n_2 = 1.6935$ | $v_2 = 53.5$ |
| $r_3 = 107.0$ | | | |
| | $d_3 = 0.3$ | | |
| $r_4 = 34.0$ | | | |
| | $d_4 = 7.77$ | $n_3 = 1.6237$ | $v_3 = 47.0$ |
| $r_5 = 95.8$ | | | |
| | $d_5 = 2.1$ | $n_4 = 1.6200$ | $v_4 = 36.3$ |
| $r_6 = 23.5$ | | | |
| | $d_6 = 18.5$ | | |
| $r_7 = -24.8$ | | | |
| | $d_7 = 5.4$ | $n_5 = 1.6889$ | $v_5 = 31.1$ |
| $r_8 = -34.0$ | | | |
| | $d_8 = 0.3$ | | |
| $r_9 = -704.2$ | | | |
| | $d_9 = 13.5$ | $n_6 = 1.6935$ | $v_6 = 53.5$ |
| $r_{10} = -30.0$ | | | |
| | $d_{10} = 2.5$ | $n_7 = 1.6364$ | $v_7 = 35.4$ |
| $r_{11} = -55.28$ | | | |

References Cited in the file of this patent

UNITED STATES PATENTS

| 2,031,792 | Richter | Feb. 25, 1936 |
| 2,171,640 | Berek | Sept. 5, 1939 |
| 2,670,659 | Tronnier | Mar. 2, 1954 |
| 2,724,994 | Lange | Nov. 29, 1955 |

FOREIGN PATENTS

| 376,044 | Great Britain | July 7, 1932 |
| 474,044 | Italy | Mar. 2, 1954 |
| 689,916 | Great Britain | Apr. 8, 1953 |